United States Patent
Bevinakatti

(10) Patent No.: US 12,435,183 B2
(45) Date of Patent: Oct. 7, 2025

(54) POLYESTER DEMULSIFIER

(71) Applicant: NOURYON CHEMICALS INTERNATIONAL B.V., Arnhem (NL)

(72) Inventor: Hanamanthsa Shankarsa Bevinakatti, Somerset, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 956 days.

(21) Appl. No.: 17/303,859

(22) PCT Filed: Dec. 11, 2019

(86) PCT No.: PCT/EP2019/084755
§ 371 (c)(1),
(2) Date: Jun. 9, 2021

(87) PCT Pub. No.: WO2020/120628
PCT Pub. Date: Jun. 18, 2020

(65) Prior Publication Data
US 2022/0041803 A1    Feb. 10, 2022

Related U.S. Application Data

(60) Provisional application No. 62/777,901, filed on Dec. 11, 2018.

(30) Foreign Application Priority Data

Jan. 18, 2019  (EP) .................... 19152548

(51) Int. Cl.
*C08G 63/48* (2006.01)
*B01D 17/04* (2006.01)
*C08G 63/668* (2006.01)

(52) U.S. Cl.
CPC ........... *C08G 63/48* (2013.01); *B01D 17/047* (2013.01); *C08G 63/668* (2013.01)

(58) Field of Classification Search
None
See application file for complete search history.

(56) References Cited

U.S. PATENT DOCUMENTS

| | | |
|---|---|---|
| 4,606,916 A | 8/1986 | Hofinger et al. |
| 4,734,523 A | 3/1988 | Hofinger et al. |
| 4,885,110 A | 12/1989 | Bose et al. |
| 5,349,011 A | 9/1994 | Reichert et al. |
| 5,406,311 A | 4/1995 | Michelson |
| 5,420,315 A | 5/1995 | Uhrig et al. |
| 5,681,876 A | 10/1997 | Schneider et al. |
| 5,723,653 A | 3/1998 | Santhanam |
| 7,148,293 B2 | 12/2006 | Stumbe et al. |
| 7,569,615 B2 | 8/2009 | Leinweber et al. |
| 9,074,121 B2 | 7/2015 | Dyer |
| 2002/0042354 A1 | 4/2002 | Lang et al. |
| 2003/0228364 A1 | 12/2003 | Nathan |
| 2006/0135628 A1 | 6/2006 | Newman et al. |
| 2008/0045667 A1 | 2/2008 | Snell et al. |
| 2008/0153931 A1 | 6/2008 | Bruchmann et al. |
| 2008/0207780 A1 | 8/2008 | Wang |
| 2009/0048352 A1 | 2/2009 | Talingting-Pabalan et al. |
| 2009/0149557 A1 | 6/2009 | Talingting-Pabalan et al. |
| 2009/0192234 A1 | 7/2009 | Saxena et al. |
| 2010/0240857 A1 | 9/2010 | Bruchmann et al. |
| 2011/0098418 A1 | 4/2011 | Morschhaeuser et al. |
| 2011/0272327 A1 | 11/2011 | Bruchmann et al. |
| 2012/0232169 A1 | 9/2012 | Wu et al. |
| 2014/0228456 A1 | 8/2014 | Bevinakatti et al. |
| 2016/0115425 A1 | 4/2016 | Blankenburg et al. |
| 2017/0022449 A1 | 1/2017 | Hunt et al. |

FOREIGN PATENT DOCUMENTS

| | | |
|---|---|---|
| DE | 3526601 A1 | 1/1987 |
| WO | 2006133868 A1 | 12/2006 |

*Primary Examiner* — Peter Keyworth
(74) *Attorney, Agent, or Firm* — Ingrassia, Fisher & Lorenz LLP

(57) ABSTRACT

A demulsifier includes the reaction product of a) alkoxylated castor oil, b) an acid having at least two carboxyl groups, a full or partial ester thereof, an anhydride thereof and combinations thereof, and optionally c) a fatty acid, a fatty acid ester and combinations thereof. A method of demulsifying a water-in-oil or oil-in-water emulsion includes adding the demulsifier to the emulsion and separating the emulsion into an oil phase and a water phase.

8 Claims, No Drawings

POLYESTER DEMULSIFIER

CROSS-REFERENCE TO RELATED APPLICATION

This application is a U.S. National-Stage entry under 35 U.S.C. § 371 based on International Application No. PCT/EP2019/084755, filed Dec. 11, 2019, which was published under PCT Article 21(2) and which claims priority to European Application No. 19152548.4, filed Jan. 18, 2019, and which claims priority to U.S. Provisional Application No. 62/777,901, filed Dec. 11, 2018, which are all hereby incorporated in their entirety by reference.

BACKGROUND

Oil extraction is the removal of oil from an oil reservoir. Oil is often recovered from a reservoir as a water-in-oil emulsion. Crude oil typically contains appreciable quantities of water as part of a crude oil emulsion. Demulsifiers are chemical compounds used to separate water-in-oil and/or oil-in-water emulsions into separate water and oil phases, and are commonly used to remove water from crude oil. It is desirable to remove water from crude oil shortly after extraction, as oil extractors prefer to store and/or ship "dry" oil (i.e. oil with low concentrations of water). Storing water with the oil takes up space on oilfield installations, and shipping crude oil containing a significant amount of water to an oil refinery is both expensive and inefficient. Thus, oil extractors aim to demulsify crude oil emulsions at the earliest after extraction and in particular at offshore platforms where space is typically limited.

Most state of the art demulsifier compositions are environmentally unfriendly. However, many environmentally friendly demulsifier compositions have performance limitations, and they typically do not work as well as those that are less environmentally friendly. Currently used demulsifiers that are environmentally unfriendly may be banned from future use. Thus, a need exists for environmentally friendly demulsifier compositions that possess similar or superior properties to standard (less-friendly) demulsifiers. This disclosure describes such demulsifier compositions.

BRIEF SUMMARY

This disclosure provides a demulsifier comprising the reaction product of:
a) alkoxylated castor oil;
b) an acid having at least two carboxyl groups, full or partial esters thereof, an anhydride thereof or combinations thereof; and
c) optionally, a fatty acid, a fatty acid ester or combinations thereof.

This disclosure also provides a method of making a demulsifier comprising the step of: reacting an alkoxylated castor oil with an acid having at least two carboxyl groups, full or partial esters thereof, an anhydride thereof or combinations thereof and, optionally, a fatty acid, a fatty acid ester or combinations thereof.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

A demulsifier is provided herein. The demulsifier comprises the reaction product of a) alkoxylated castor oil, b) an acid having at least two carboxyl groups, full or partial esters thereof, an anhydride thereof and combinations thereof, and c) optionally, a fatty acid, a fatty acid ester and combinations thereof.

Also provided is a method of demulsifying an emulsion, wherein the emulsion is a water-in-oil emulsion or an oil-in-water emulsion. The method comprises the steps of adding the demulsifier to the emulsion, the water component of the emulsion, and/or the oil component of the emulsion, and separating the emulsion into an oil phase and a water phase.

A method of making a demulsifier composition is also provided. The method comprises the step of reacting alkoxylated castor oil with an acid having at least two carboxyl groups, full or partial esters thereof, an anhydride thereof and combinations thereof and, optionally, a fatty acid, a fatty acid ester and combinations thereof.

A demulsifier according to this disclosure includes the reaction product of alkoxylated castor oil with an acid having at least two carboxyl groups, full or partial esters thereof, an anhydride thereof and combinations thereof. Alternatively, the demulsifier includes the reaction product of alkoxylated castor oil; an acid having at least two carboxyl groups, full or partial esters thereof, an anhydride thereof and combinations thereof; and a fatty acid, a fatty acid ester and combinations thereof. The disclosed demulsifier separates oil-in-water and/or water-in-oil emulsions. The water-in-oil emulsions are typically observed in crude oil.

Alkoxylated castor oil. Castor oil is a vegetable oil obtained from the seeds of the castor oil plant (*Ricinus communis*). Castor oil is a triglyceride having predominantly ricinoleic acid, oleic acid and linoleic fatty acid chains. Approximately 85-95% of castor oil fatty acid chains are ricinoleic acid. Ricinoleic acid is a monounsaturated, 18-carbon fatty acid that includes a hydroxyl functional group on the twelfth carbon atom of the fatty acid chain. This hydroxyl functional group provides a preferred site for alkoxylation. The following structure (1) illustrates castor oil having three ricinoleic acid chains:

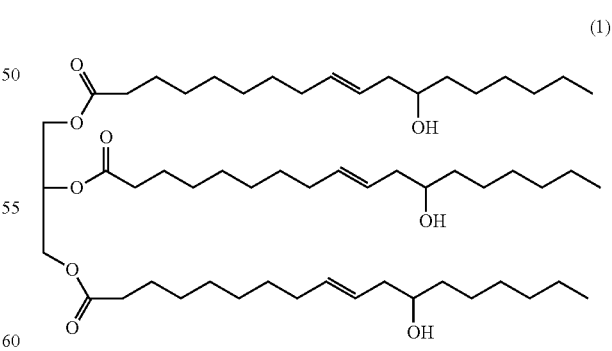

(1)

Alkoxylation is a reaction that involves the addition of an epoxide (a cyclic ether) to a compound. Suitable epoxides for alkoxylation of castor oil include ethylene oxide ($C_2H_4O$), propylene oxide ($CH_3CHCH_2O$) and epoxy butanes. Once alkoxylated, the ricinoleic (or oleic acid, linoleic acid, etc.) fatty acid chains contain alkoxy groups (e.g., ethyleneoxy, propoxy, etc.) at the hydroxy site on the fatty acid chain and/or the glycerol/ester linkages of the triglyceride. In some embodiments, the hydroxyl sites on the fatty acid chain are alkoxylated. In other embodiments, alkoxy groups are located at the fatty acid hydroxyl sites and the ester linkages. Alkoxylation at both sites or just on the hydroxyl groups may be controlled by the catalyst used. Both types of alkoxylated castor oil are commercially available. In an embodiment, the alkoxylated castor oil is ethoxylated castor oil.

The extent of alkoxylation of alkoxylated castor oil may vary. Different alkoxylation sites, each hydroxyl group on the fatty acid chains and each ester linkage, may contain different numbers of alkoxy groups. In some embodiments, each mole of alkoxylated castor oil contains, on average, between about 5 alkoxy units and about 200 alkoxy units (i.e., from about 5 to about 200 moles of alkoxy units per mole of castor oil). In some embodiments, the about 5 alkoxy units to about 200 alkoxy units are located at the hydroxyl sites on the ricinoleic acid chain. In other embodiments, the about 5 alkoxy units to about 200 alkoxy units are located across the fatty acid hydroxyl sites and the ester linkages. In some embodiments, the about 5 alkoxy units to about 200 alkoxy units are ethyleneoxy units. In other embodiments, each mole of alkoxylated castor oil contains between about 5 alkoxy units and about 165 alkoxy units, between about 10 alkoxy units and about 165 alkoxy units, between about 15 alkoxy units and about 165 alkoxy units or between about 5 alkoxy units and about 30 alkoxy units. In some embodiments, the alkoxy units recited above are ethyleneoxy units.

Carboxylic acid. The acid having at least two carboxyl groups may have two, three or four carboxyl (—COOH) groups. The acid having at least two carboxyl groups may be linear or branched and saturated or unsaturated. When two carboxyl groups are present and the acid is linear, the acid is a dicarboxylic acid and has the general formula HOOC$(CH_2)_n$COOH. In some embodiments, n has a value between about 2 and about 34. In these embodiments, the acid has between about 4 and about 36 carbon atoms in total. The value of n may be the same for branched acids. Suitable acids include succinic acid, adipic acid, glutaric acid, sebacic acid, and combinations thereof. When three carboxyl groups are present, the acid is a triacid. Suitable triacids include citric acid ($C_6H_8O_7$). When four carboxyl groups are present, the acid is a tetracid. Suitable examples of branched acids include itaconic acid and citraconic acid. In an embodiment, the acid having at least two carboxyl groups comprises an acid selected from succinic acid, adipic acid, glutaric acid, citric acid, and combinations thereof.

Ester. A full or partial ester of the acids described above may be used in place of the above acid. For example, in the case of a linear dicarboxylic acid, a full ester (diester) has the general formula $R^1$OOC$(CH_2)_n$COO$R^2$ where $R^1$ and $R^2$ are alkyl or aryl groups. In some embodiments, n has a value between about 2 and about 34. $R^1$ and $R^2$ may be different alkyl or aryl groups or the same. In a partial ester, less than all the carboxylic acid groups are replaced with an ester group. In some embodiments, both an acid having at least two carboxyl groups and a full or partial ester are used to produce the demulsifier.

Anhydride. An organic acid anhydride may be used in place of or in conjunction with the above carboxylic acid. An anhydride of a linear dicarboxylic acid has the general formula $R^1$(CO)—O—(CO)$R^2$ where $R^1$ and $R^2$ are alkyl or aryl groups. $R^1$ and $R^2$ may be different alkyl or aryl groups or the same. Suitable organic acid anhydrides include succinic anhydride, maleic anhydride, alkenyl succinic anhydride, itaconic anhydride, citraconic anhydride and combinations thereof. In some embodiments, both an acid having at least two carboxyl groups and an organic acid anhydride are used to produce the demulsifier.

In some embodiments, the demulsifier is the reaction product of alkoxylated castor oil; an acid having at least two carboxyl groups, full or partial esters thereof, an anhydride thereof and combinations thereof (as described above); and a fatty acid, a fatty acid ester and combinations thereof.

Fatty acid. When used, the fatty acid has the general formula R—COOH where R is an alkyl or an aryl group. An alkyl R group may be saturated or unsaturated, linear or branched and cycloalkyl or aryl. In some embodiments, the R group contains between about 7 carbon atoms and about 21 carbon atoms. In these embodiments, the fatty acid has between about 8 and about 22 carbon atoms in total. A mixture of fatty acids may be present. Suitable fatty acids include tallow fatty acids, tall oil fatty acids, coconut fatty acids, palmitic acid, stearic acid, myristic acid, oleic acid, palmitoleic acid, linoleic acid, linolenic acid, lauric acid, decanoic acid, caprylic acid and combinations thereof. In an embodiment, the fatty acid comprises an acid selected from tallow fatty acids, tall oil fatty acids, palmitic acid, stearic acid, myristic acid, oleic acid, palmitoleic acid, linoleic acid, linolenic acid, and combinations thereof. In some embodiments, a majority of the fatty acid contains chains having between about 12 and about 18 carbon atoms.

Fatty acid ester. When used, the fatty acid ester has the general formula $R^1$—COO$R^2$ where $R^1$ and $R^2$ are alkyl or aryl groups. Alkyl $R^1$ and $R^2$ groups may be saturated or unsaturated and linear or branched. $R^1$ and $R^2$ may be different alkyl or aryl groups or the same. In some embodiments, the $R^1$ and $R^2$ groups contain between about 7 carbon atoms and about 21 carbon atoms. A mixture of fatty acid esters may be present. Suitable fatty acid esters include esters of the fatty acids described herein, including rapeseed methyl ester and tallow methyl ester. In some embodiments, the fatty acid esters are methyl, ethyl, propyl and/or butyl esters of the fatty acids described herein. In some embodiments, a majority of the fatty acid contains chains having between about 12 and about 18 carbon atoms. In some embodiments, both a fatty acid and a fatty acid ester are used to produce the demulsifier.

The molar ratio of the alkoxylated castor oil to the acid having at least two carboxyl groups, full or partial ester thereof, anhydride thereof and combination thereof is at least about 1:1, or at least about 1.5:1. The molar ratio of the alkoxylated castor oil to the acid having at least two carboxyl groups, full or partial ester thereof, anhydride thereof and combination thereof is up to about 5:1, or up to about 3:1.

The molar ratio of alkoxylated castor oil to the fatty acid, the fatty acid ester and combination thereof is at least about 1:1, or at least about 1.5:1. The molar ratio of the alkoxylated castor oil to the fatty acid, the fatty acid ester and combination thereof is up to about 10:1, or up to about 3:1.

The reaction product is prepared by reacting the alkoxylated castor oil; the acid having at least two carboxyl groups, the full or partial ester thereof, the anhydride thereof and combination thereof, and, optionally, the fatty acid, the fatty acid ester and combination thereof, all described herein. The reaction may occur without using any catalyst or in the presence of a basic or acidic catalyst. Suitable base catalysts include sodium hydroxide, potassium hydroxide, sodium carbonate, potassium carbonate. Suitable acid catalysts include phosphorous acid, hypophosphorous acid, hypophosphoric acid, and para-toluenesulfonic acid monohydrate. The reaction may proceed at temperatures up to about 200° C. in a nitrogen environment and/or under vacuum conditions (e.g., from about 7 to about 20 kPa).

The reaction product yielded by the above reaction conditions is a polyester suitable for use as a demulsifier. In one embodiment, the structure of the demulsifier includes one alkoxylated castor oil moiety joined to another alkoxylated castor oil moiety by the acid having at least two carboxyl groups, the full or partial ester thereof, the anhydride thereof and combination thereof (for example, a $—(CO)(CH_2)_n(CO)—$ group). The $—(CO)(CH_2)_n(CO)—$ (or other corresponding acid) group is located between alkoxy units present on each alkoxylated castor oil moiety. The four remaining alkoxy units (two on each alkoxylated castor oil moiety) are either capped with a $—(CO)R$ group (e.g., from the fatty acid and/or fatty acid ester, when used) ($R'=CO—R$) or are left unreacted ($R'=H$). The following illustrate structures described above where the alkoxy group is ethyleneoxy (EO) and where X is $(CH_2)_n$, depending on the presence and molar ratio of the fatty acid and/or fatty acid ester. The following structure (2) shows that the remaining ethyleneoxy units contain hydrogen ($R'=H$):

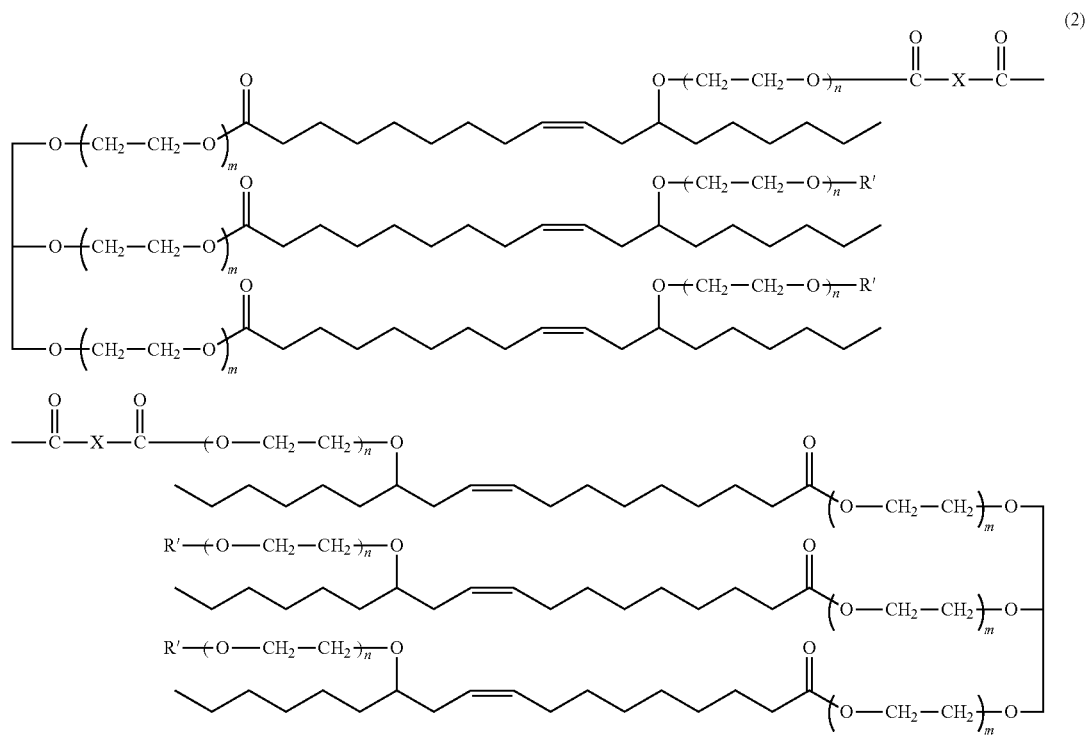

(2)

where m+n is a number from about 10 to about 65, R is a hydrocarbon having from about 7 to about 21 carbon atoms, and X is a hydrocarbon having from about 4 to about 34 carbon atoms.

The following structure (3) shows that one of the remaining ethyleneoxy units is capped by a fatty acid/ester group ($R'=CO—R$) and the remaining three contain hydrogen ($R'=H$):

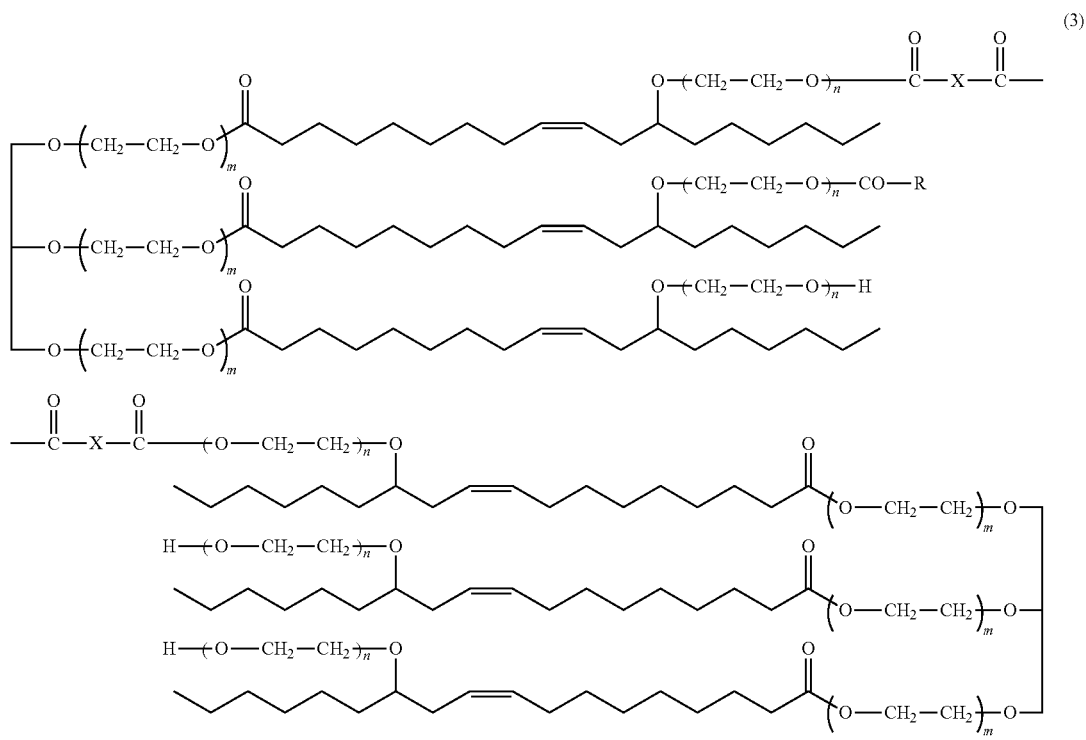

(3)

where m+n is a number from about 10 to about 65, R is a hydrocarbon having from about 7 to about 21 carbon atoms, and X is a hydrocarbon having from about 4 to about 34 carbon atoms.

The following structure (4) shows that all four of the remaining ethyleneoxy units are capped by a fatty acid/ester group (R'=CO—R):

The reaction product may also include water. In some embodiments, water is removed from the reaction product so that the total water concentration is below about 5 percent by weight, or less than about 3 percent by weight, or less than about 2 percent by weight, or less than about 1 percent by

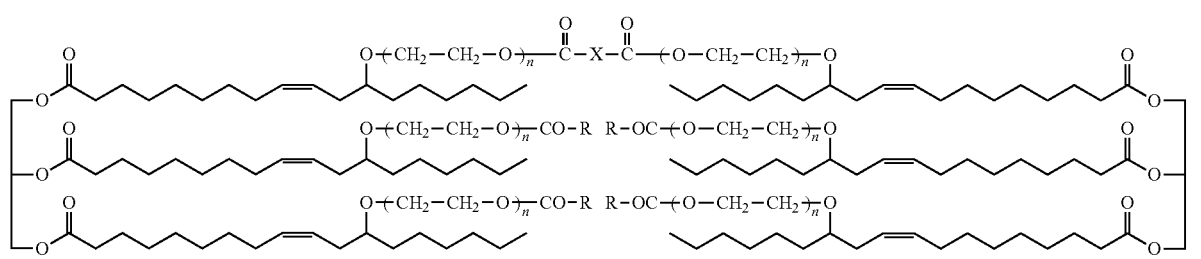

(4)

where m+n is a number from about 10 to about 65, R is a hydrocarbon having from about 7 to about 21 carbon atoms, and X is a hydrocarbon having from about 4 to about 34 carbon atoms.

While the structure above shows the "top" two fatty acid chains bridged by the —(CO)(CH$_2$)$_n$(CO)— group, other bridging configurations between two (or, in the case of triacids and tetracids, three or four, respectively) alkoxylated castor oil moieties are contemplated. The m and n values for the ethyleneoxy groups may be the same or different depending on the composition of the ethoxylated castor oil.

In an embodiment, the demulsifier has the general formula selected from the structure (2), structure (3), structure (4), and combinations thereof.

weight. Alternatively, the water may remain in mixture with the reaction product until after demulsification of the target emulsion.

Alternatively, the reaction product may be thought of as containing alkoxylated castor oil residues, diacid-type residues and, optionally, fatty acid residues. The diacid-type residues include the diacid, triacid and tetracid described herein (or the full or partial ester thereof and/or the anhydride thereof). Approximately about 2 alkoxylated castor oil residues are present for each diacid residue. Approximately about 2 to about 3 alkoxylated castor oil residues are present for each triacid residue. Approximately about 2 to about 4 alkoxylated castor oil residues are present for each tetracid residue. When present, the number of fatty acid residues may range from between about 0 and about 8 per diacid-type residue (depending on the number of available free fatty chains on the alkoxylated castor oil residues).

A method according to this disclosure includes a method of making a polyester demulsifier by reacting the alkoxylated castor oil with of an acid having at least two carboxyl groups, a full or partial ester thereof, an anhydride thereof and combinations thereof. Alternatively, a method of making a polyester demulsifier includes reacting the alkoxylated castor oil; the acid having at least two carboxyl groups, full or partial esters thereof, the anhydride thereof and combinations thereof; and a fatty acid, a fatty acid ester and combinations thereof. Generally, the reaction takes place at temperatures up to about 200° C. in a nitrogen environment and/or under vacuum conditions (e.g., from about 7 to about 20 kPa) for a period of time sufficient to form a polyester demulsifier.

Another method according to this disclosure includes a method of demulsifying an oil-in-water emulsion or a water-in-oil emulsion. The method includes adding an effective amount of the demulsifier prepared by reacting the alkoxylated castor oil; an acid having at least two carboxyl groups, full and partial esters thereof, an anhydride thereof and combinations thereof; and, optionally, a fatty acid, a fatty acid ester and combinations thereof, described herein to an oil-in-water emulsion or a water-in-oil emulsion. In some embodiments, the emulsion is a water-in-oil emulsion, such as a crude oil emulsion containing salt water, sea water and/or ocean water. Alternatively, the demulsifier may be added to an oil (e.g., crude oil) before an emulsion is formed with the oil. For instance, the demulsifier may be added to a crude oil upstream of a separator at an oilfield installation. The demulsifier may also be used to prevent emulsification as a nonemulsifier. The method further includes the step of separating the emulsion into an oil phase and a water phase.

The demulsifier described herein may be used alone as a demulsifier or combined with other demulsifiers to separate the phases of oil-in-water and/or water-in-oil emulsions. The exact composition of a demulsifier formulation (the demulsifier described herein alone or used in combination with other demulsifiers, droppers and/or dryers) may vary depending on the properties of the targeted emulsion. Crude oils obtained from the same well may change over time and changing environmental conditions (e.g., temperature, pressure) may require changes to the demulsification formulation in order to maintain effectiveness.

The demulsifier formulation may be used at a concentration between about 1 part per million (ppm) and about 1000 ppm. In some embodiments, the demulsifier formulation is used at a concentration between about 5 ppm and about 500 ppm. In some other embodiments, the demulsifier formulation is used at a concentration between about 10 ppm and about 400 ppm. In still other embodiments, the demulsifier formulation is used at a concentration between about 20 ppm and about 200 ppm.

EXAMPLES

For illustrative purposes, the following examples are disclosed. All percentages used are by weight unless otherwise stated.

Example 1. Preparation of Ethoxylated Castor Oil (29 EO) Polyester 283 grams of ethoxylated castor oil (sourced from Nouryon), 17.5 grams of adipic acid (Alfa Aesar), 33.1 grams of tallow fatty acid (Nouryon) and 1.8 grams of phosphorous acid (Acros Organics) were added to a 500-mL flask. On average, the ethoxylated castor oil contained 29 moles of ethyleneoxy units for each mole of ethoxylated castor oil. The flask was flushed with nitrogen gas. While the flask contents were mixed the flask was heated in an oil bath at an oil bath temperature of 200° C. After about two hours of mixing, the reaction mixture became clear and a vacuum was applied to the flask. After about eight hours of mixing, the acid value reached a constant value and the reaction product was cooled to about 80° C. and then collected.

Example 2. Preparation of Ethoxylated Castor Oil (20 EO) Polyester 422 grams of ethoxylated castor oil (sourced from Nouryon), 26.3 grams of adipic acid, 50.3 grams of tall oil fatty acid (Nouryon) and 4.9 grams of hypophosphoric acid (50% in water) were added to a 1-L flask. On average, the ethoxylated castor oil contained 20 moles of ethyleneoxy units for each mole of ethoxylated castor oil. The flask was flushed with nitrogen gas. The pressure in the reactor was reduced to 20 kPa and the reactor was heated to a temperature of 180° C. Once the temperature reached 180° C., full vacuum (7-8 kPa) was applied and the temperature was increased to 200° C. After about eight hours of mixing, the reaction product was cooled to 80° C. and then collected.

Example 3. Preparation of Ethoxylated Castor Oil (20 EO) Polyester 377 grams of ethoxylated castor oil (sourced from Nouryon), 23.4 grams of adipic acid and 1.96 grams of phosphorous acid were added to a 1-L flask. On average, the ethoxylated castor oil contained 20 moles of ethyleneoxy units for each mole of ethoxylated castor oil. The flask was flushed with nitrogen gas. While the flask contents were mixed, the flask was heated in an oil bath at an oil bath temperature of 200° C. After about two hours of mixing, the reaction mixture became clear and a vacuum was applied to the flask. After about eight hours of mixing, the acid value reached a constant value and the reaction product was cooled to about 80° C. and then collected.

Example 4. Preparation of Ethoxylated Castor Oil (20 EO) Polyester 330 grams of ethoxylated castor oil (sourced from Nouryon) and 18.5 grams of dibasic acid (Invista Specialty Chemicals) were added to a 1-L flask. On average, the ethoxylated castor oil contained 20 moles of ethyleneoxy units for each mole of ethoxylated castor oil. The flask was flushed with nitrogen gas. While the flask contents were mixed, the flask was heated in an oil bath at an oil bath temperature of 200° C. After about two hours of mixing, the reaction mixture became clear and a vacuum was applied to the flask. After about eight hours of mixing, the acid value reached a constant value and the reaction product was cooled to about 80° C. and then collected.

Example 5. Preparation of Ethoxylated Castor Oil (20 EO) Polyester 283 grams of ethoxylated castor oil (sourced from Nouryon), 15.8 grams of dibasic acid and 33 grams of tallow fatty acid were added to a 1-L flask. On average, the ethoxylated castor oil contained 20 moles of ethyleneoxy units for each mole of ethoxylated castor oil. The flask was flushed with nitrogen gas. While the flask contents were mixed, the flask was heated in an oil bath at an oil bath temperature of 200° C. After about two hours of mixing, the reaction mixture became clear and a vacuum was applied to the flask. After about eight hours of mixing, the acid value reached a constant value and the reaction product was cooled to about 80° C. and then collected.

Example 6. Preparation of Ethoxylated Castor Oil (26 EO) Polyester 451 grams of ethoxylated castor oil (sourced from Nouryon), 28.1 grams of adipic acid, 54.4 grams of tall oil fatty acid and 1.77 grams of para-toluenesulfonic acid were added to a flask. On average, the ethoxylated castor oil contained 26 moles of ethyleneoxy units for each mole of ethoxylated castor oil. The flask was flushed with nitrogen gas. The pressure in the reactor was reduced to 20 kPa and the reactor was heated to a temperature of 180° C. Once the temperature reached 180° C., full vacuum (7-8 kPa) was applied and the temperature was increased to 200° C. After about eight hours of mixing, the reaction product was cooled to 80° C. and then collected.

Example 7. Preparation of Ethoxylated Castor Oil (36 EO) Polyester 550 grams of ethoxylated castor oil (sourced from Nouryon), 34.3 grams of adipic acid, 66.3 grams of tall oil fatty acid and 4.89 grams of hypophosphorous acid were added to a flask. On average, the ethoxylated castor oil contained 36 moles of ethyleneoxy units for each mole of ethoxylated castor oil. The flask was flushed with nitrogen gas. The pressure in the reactor was reduced to 20 kPa and the reactor was heated to a temperature of 180° C. Once the temperature reached 180° C., full vacuum (7-8 kPa) was applied and the temperature was increased to 200° C. After about eight hours of mixing, the reaction product was cooled to 80° C. and then collected.

Example 8. Preparation of Ethoxylated Castor Oil (60 EO) Polyester 100 grams of ethoxylated castor oil (sourced from Nouryon), 6.3 grams of adipic acid, 11.9 grams of tall oil fatty acid and 0.4 grams of para-toluenesulfonic acid were added to a flask. On average, the ethoxylated castor oil contained 60 moles of ethyleneoxy units for each mole of ethoxylated castor oil. The flask was flushed with nitrogen gas. The pressure in the reactor was reduced to 20 kPa and the reactor was heated to a temperature of 180° C. Once the temperature reached 180° C., full vacuum (7-8 kPa) was applied and the temperature was increased to 200° C. After about eight hours of mixing, the reaction product was cooled to 80° C. and then collected.

The ethoxylated castor oil polyesters prepared in Examples 1, 6 and 7 were screened for toxicity and for biodegradability in seawater. Toxicity was assessed using *Daphnia magna* and algae. Biodegradability in seawater was performed according to the *OECD Guideline for Testing of Chemicals, Section 3; Degradation and Accumulation, No. 306: Biodegradability in Seawater, Closed Bottle Test*. Table 1 illustrates toxicity and biodegradability test results for the ethoxylated castor oil polyesters.

TABLE 1

Toxicity and Biodegradation Results

| Sample | Toxicity (mg/L) Daphnia | Algae | Biodegradation (%) 7 days | 14 days | 21 days | 28 days | 42 days | 56 days | 84 days | 112 days |
|---|---|---|---|---|---|---|---|---|---|---|
| Example 1 | >100 | >100 | 13 | 33 | 46 | 49 | 54 | 59 | 59 | 62 |
| Example 6 | >1000 | >10 < 100 | 51 | 63 | 69 | 69 | 77 | 83 | — | — |
| Example 7 | >1000 | >100 < 1000 | 31 | 47 | 55 | 56 | 63 | 70 | — | — |

As is stated in the Introduction to Section 3 of the *OECD Test Guidelines—Biodegradation and Bioaccumulation* (2005), a biodegradation result greater than 20% after 28 days is indicative of potential for (inherent) primary biodegradation in the marine environment.

The toxicity and biodegradation test results in Table 1 demonstrate that each of the Example 1, 6 and 7 ethoxylated castor oil polyesters meet the OSPAR regulatory requirements for a "green" demulsifier. It is expected that the Example 2-5 and 8 ethoxylated castor oil polyesters will provide comparable results to that of Examples 1, 6 and 7.

The performance of the Example demulsifiers was evaluated by carrying out tests on emulsions of crude oil from the North Sea and synthetic North Sea water. The speed of separation and the clarity (transmission) of the water phase were assessed using a Turbiscan™ Lab Expert instrument (Formulaction SA, France). The Turbiscan™ instrument is an automated, vertical scan analyzer that may be used for studying the stability of concentrated emulsions. It is equipped with a near-infrared light source and detection systems for transmission as well as light scattering (backscattering). The demulsifiers were diluted with/dissolved in butyl diglycol (BDG) to facilitate dosage of small concentrations in the tests.

Table 2 illustrates Turbiscan™ data for Examples 1 through Example 5 ethoxylated castor oil polyesters in addition to a demulsifier that is not considered to be a "green" demulsifier according to OSPAR criteria (Witbreak DGE 169, available from Nouryon). Witbreak DGE 169 contains more than a dozen propylene oxide units. While biodegradation testing of Witbreak DGE 169 was not conducted, it is expected to have a far less favourable profile than the demulsifiers described in this disclosure. The ppm column indicates the concentration of the demulsifier used in the test. "Avg Transmission" (of the water layer) is the average transmission reading between the 0 distance and the 5 position of the crude oil-water boundary at 40 minutes. "StartTime" is the first non-zero signal of transmission, which is later developed into the water layer at the bottom of the testing vial. "HalfTime" is the time when the crude oil-water boundary reaches the midway height of a completely demulsified mixture (e.g., 8 mm when a completely demulsified mixture has a height of 16 mm in the test vial). "End distance" is the position of the crude oil-water boundary at the end of the experiment (40 minutes). "WaterOut" is the (End distance−height of completely demulsified mixture)/height of completely demulsified mixture×100.

TABLE 2

Turbiscan™ Results

| Demulsifier | ppm | Avg Transmission (%) | StartTime (minutes) | HalfTime (minutes) | WaterOut (%) | End distance |
|---|---|---|---|---|---|---|
| Witbreak DGE 169 | 50 | 63.8 | 0 | 1 | 103 | 16.5 |
| Example 1 | 50 | 63.1 | 6 | 20 | 84 | 13.4 |
| Example 2 | 50 | 46.1 | 0 | 0 | 98 | 15.6 |
| Example 3 | 50 | 80.6 | 4 | 21.4 | 81 | 13.0 |
| Example 4 | 50 | 76.6 | 10 | 33.1 | 59 | 9.4 |
| Example 5 | 50 | 76.5 | 7 | 36 | 54 | 8.7 |

The Turbiscan™ results demonstrate that the ethoxylated castor oil polyesters prepared according to Examples 1 through 5 provide at least an adequate level of demulsification.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed, but that the present disclosure will include all embodiments falling within the scope of the appended claims.

What is claimed is:

1. A demulsifier comprising the reaction product of:
   a) alkoxylated castor oil;
   b) an acid having at least two carboxyl groups; and
   c) optionally, a fatty acid;

wherein the alkoxylated castor oil comprises from 5 to 200 moles of alkoxy units per mole of castor oil and wherein the demulsifier has the structure:

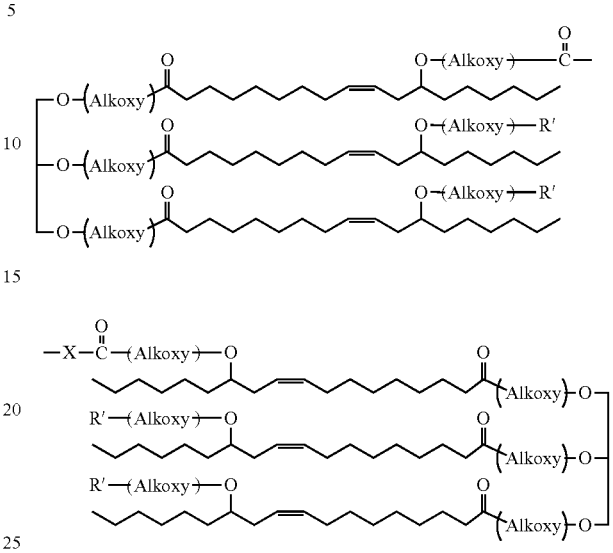

wherein R' is —H or —CO—R, R is a hydrocarbon having from 7 to 21 carbon atoms, and X is a hydrocarbon having from 4 to 34 carbon atoms.

2. The demulsifier according to claim 1, having the structure:

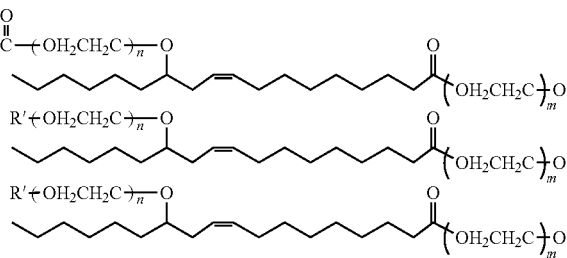

wherein m in is a number from 10 to 65, R' is —H or —CO—R, R is a hydrocarbon having from 7 to 21 carbon atoms, and X is a hydrocarbon having from 4 to 34 carbon atoms.

3. The demulsifier according to claim 1, wherein the alkoxy group is ethyleneoxy.

4. The demulsifier according to claim 1, wherein the acid having at least two carboxyl groups comprises an acid selected from succinic acid, adipic acid, glutaric acid, citric acid and combinations thereof.

5. The demulsifier according to claim 1, wherein the fatty acid comprises an acid selected from tallow fatty acids, tall oil fatty acids, palmitic acid, stearic acid, myristic acid, oleic acid, palmitoleic acid, linoleic acid, linolenic acid and combinations thereof.

6. A method of demulsifying an emulsion, wherein the emulsion is a water-in-oil emulsion or an oil-in-water emulsion, wherein the emulsion comprises a water component and an oil component, the method comprising the steps of:
   adding the demulsifier of claim 1 to the emulsion, the water component of the emulsion, and/or the oil component of the emulsion; and separating the emulsion into an oil phase and a water phase.

7. The method according to claim 6, wherein the demulsifier is added to the emulsion, the water component of the emulsion, and/or the oil component of the emulsion at a concentration from 1 ppm to 1000 ppm.

8. A method of making the demulsifier of claim 1, said method comprising the step of:
reacting the alkoxylated castor oil with the acid having at least two carboxyl groups and, optionally, the fatty acid.

* * * * *